United States Patent [19]

Bennett, deceased et al.

[11] Patent Number: 4,641,388
[45] Date of Patent: Feb. 10, 1987

[54] HYDRAULIC CONTROL SYSTEM FOR A DOCKBOARD

[75] Inventors: David E. Bennett, deceased, late of Waukesha; by Barbara E. Bennett, personal representative, Milwaukee, both of Wis.

[73] Assignee: Kelley Company, Inc., Milwaukee, Wis.

[21] Appl. No.: 636,688

[22] Filed: Aug. 1, 1984

[51] Int. Cl.⁴ .............................................. E01D 1/00
[52] U.S. Cl. .................. 14/71.7; 91/189 R; 91/520
[58] Field of Search ...................... 14/69.5, 71.1, 71.3, 14/71.5, 71.7; 91/189 A, 415, 189 R, 417 R, 520; 119/82; 105/436

[56] References Cited

U.S. PATENT DOCUMENTS 3,345,665 10/1967 Anderson, Jr. ...................... 14/71.7
4,365,374 12/1982 Bennett ................................ 14/71.7

FOREIGN PATENT DOCUMENTS 2815535 10/1979 Fed. Rep. of Germany ....... 14/71.7

Primary Examiner—James A. Leppink
Assistant Examiner—John F. Letchford
Attorney, Agent, or Firm—Andrus, Sceales, Starke & Sawall

[57] ABSTRACT

A hydraulically operated dockboard comprising a ramp which is hinged at its rear edge to the frame of the dockboard, and a lip is hinged to the forward edge of the ramp. A main hydraulic cylinder unit connects the frame and the ramp, and by operating the cylinder unit the ramp can be pivoted upwardly from a horizontal cross traffic position to an upwardly inclined position. A lip cylinder interconnects the ramp and the lip and acts to pivot the lip from a downwardly hanging pendant position to an extended position. A hydraulic line is connected to the lip cylinder, and a control valve interconnects the hydraulic line to either a supply line or a return line that is connected to the reservoir of the hydraulic system. The control valve is normally biased to a first position where the lip cylinder is connected to the return line. When it is desired to extend the lip, fluid is supplied through the supply line to pressurize the control valve and move the control valve to a second position where it connects the supply line to the lip cylinder to thereby introduce fluid to the lip cylinder to pivot the lip to the extended position. When the lip is subsequently lowered into engagement with the bed of a carrier, pressure on the control valve is released causing the control valve to return to its first position where the lip cylinder is connected to the return line. When the carrier pulls away from the dock, the lip will fall by gravity, causing fluid to flow the lip cylinder through the control valve to the reservoir.

1 Claim, 9 Drawing Figures

HYDRAULIC CONTROL SYSTEM FOR A DOCKBOARD

BACKGROUND OF THE INVENTION

In a conventional hydraulically operated dockboard, a hydraulic cylinder unit interconnects the frame and the ramp. By operating the cylinder unit to extend the piston rod or ram, the ramp will be pivoted upwardly to an inclined position.

Hydraulic dockboards can also include a separate hydraulic lip lifting cylinder which operates to pivot the lip from a downwardly hanging pendant position to an outwardly extended position. The lip lifting cylinder can be operated through separate manual controls, or in other cases, the lip lifting cylinder is interlinked with operation of the main cylinder so that hydraulic fluid will be supplied to the lip lifting cylinder from the hydraulic system when the ramp is elevated to a predetermined position.

U.S. Pat. No. 4,365,374 is directed to a hydraulic dockboard in which the flow of hydraulic fluid to the lip cylinder is controlled by, and supplied through, the main cylinder. With the construction shown in the aforementioned patent, when the main cylinder is operated to raise the ramp, the piston rod of the cylinder is extended and as the piston approaches the end of its stroke of travel, a passage is opened which supplies hydraulic fluid from the end of the main cylinder to the lip cylinder to thereby operate the lip cylinder and pivot the lip from the pendant position to the extended position.

With the dockboard of the above-mentioned patent, when the ramp is elevated and the flow of pressurized fluid to the main cylinder is terminated, the combined weight of the ramp and the lip will cause the main cylinder to retract and the ramp will pivot downwardly until the extended lip engages the bed of a truck or carrier parked in front of the loading dock. With the lip engaged with the bed of a carrier, the pressure in both the main cylinder the lip cylinder will drop to near ambient pressure.

After the loading operation has been completed, and the truck pulls away from the loading dock, the ramp will again descend by gravity and the hydraulic back pressure is reestablished, preventing the lip from moving to its pendant position, until descent of the ramp has been stopped by engagement of the ramp with a fixed support at a below dock level position. Thus, with the construction shown in U.S. Pat. No. 4,365,374, the lip will not be returned to its downwardly hanging pendant position until the ramp engages a fixed support at a below dock level position.

SUMMARY OF THE INVENTION

The invention is directed to an improved hydraulic control system for a dockboard which will enable the lip to return from the extended position to a downwardly hanging pendant position without the necessity of the ramp being moved to a below dock level position. In accordance with the invention, a control valve is mounted in the hydraulic line leading to the lip lifting cylinder and the valve connects the lip cylinder to a pressurized supply line or to a return line, which is connected to the reservoir for the hydraulic system. When the ramp is at its normal horizontal cross traffic position, the valve is biased to a first position where the lip cylinder is connected to the return line.

When the ramp is elevated through operation of the main hydraulic cylinder and reaches a predetermined elevation, hydraulic fluid will then be supplied through the supply line and the pressure in the supply line will overcome the biasing force to move the control valve a second position, where the supply line is connected to lip cylinder, thereby enabling pressurized fluid to be supplied to the lip cylinder to pivot the lip from the downwardly hanging pendant position to the extended position.

With the ramp fully elevated, the hydraulic system will then be deactivated, and due to the combined weight of the ramp and lip, the ramp will descend by gravity until the extended lip engages the bed of a truck or carrier parked in front of the loading dock. The rate of ramp descent is controlled by a restrictive orifice in the return line extending between the main cylinder and the reservoir, resulting in pressure being maintained in the main cylinder and the lip cylinder until the descent of the ramp is arrested.

When the extended lip engages the bed of the carrier, pressure in both the lip cylinder and the main cylinder will drop to near ambient pressure. This drop in pressure will enable the biasing force to move the control valve back to its first position, where the hydraulic line will be connected to the reservoir via the return line. After the loading operation has been completed and the carrier moves away from the dock, the lip will pivot downwardly by gravity, forcing the fluid from the lower end of the lip cylinder through the control valve and back to the reservoir.

With the construction of the invention, the lip will return to its downwardly haning pendant position without the necessity of the ramp being moved to a below dock level position. This facilitates the use of the dockboard in end loading operations, or under conditions where it is desired to store the dockboard overnight with a truck being parked in front of the loading dock.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
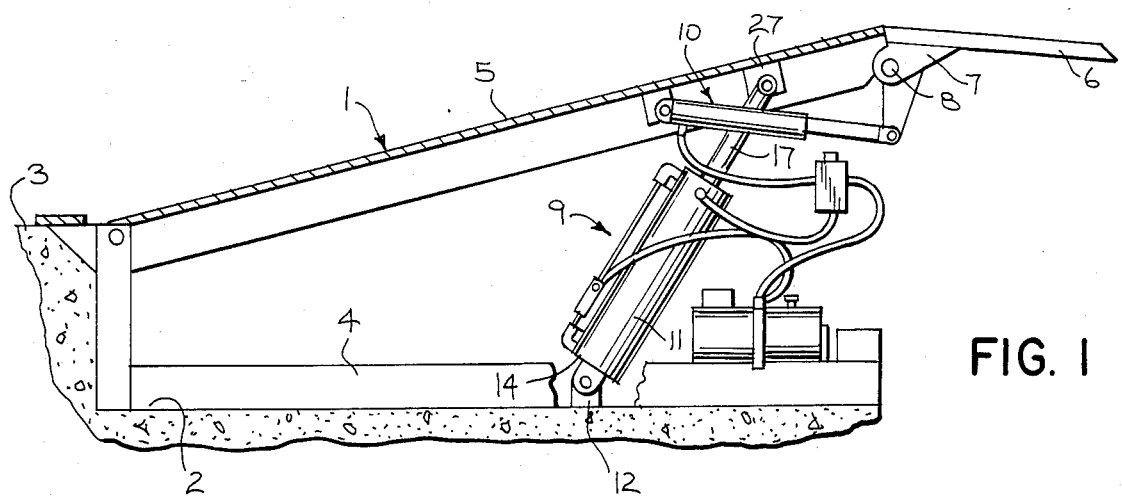
FIG. 1 is a side elevation of the hydraulic dockboard of the invention with the ramp in an upwardly inclined position and the lip in the extended positon.
Figure 3:
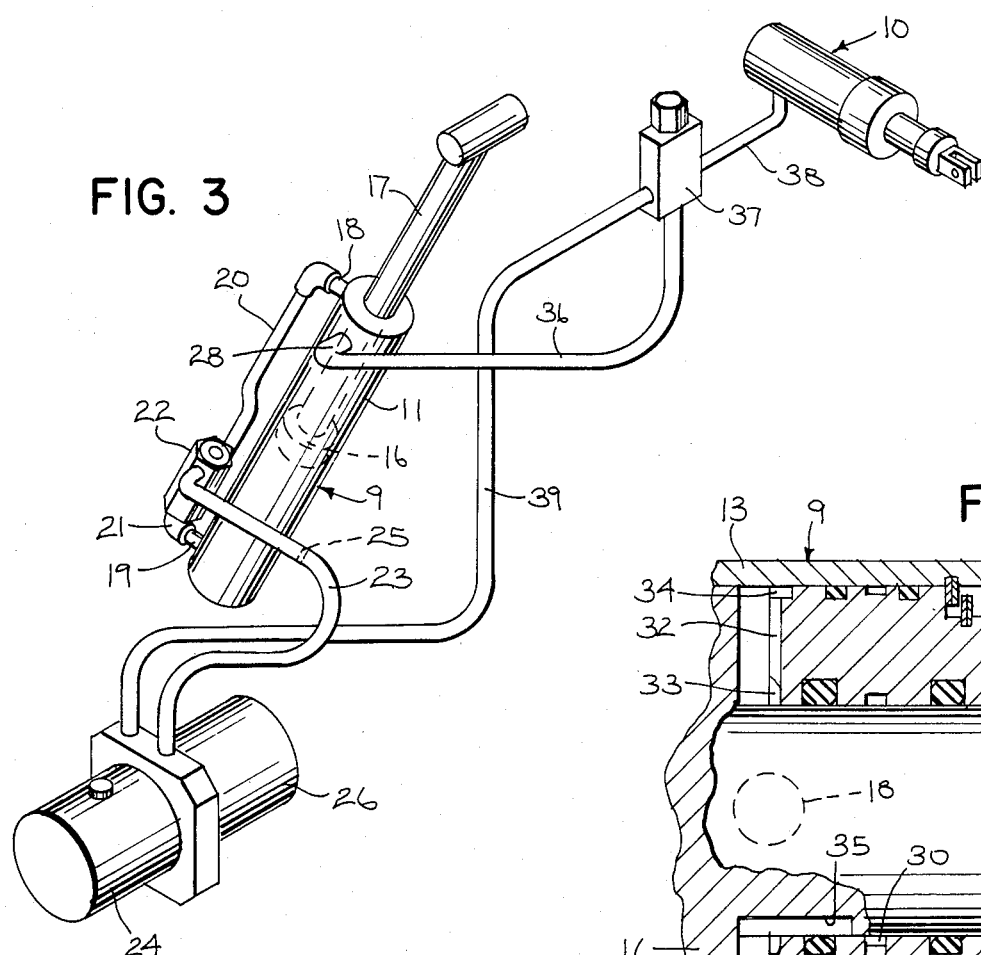
FIG. 3 is a schematic representation showing the arrangement of the main cylinder, the lip cylinder and the control valve.

FIG. 1 shows a dockboard 1 which is mounted in a pit or depression 2 in a loading dock 3. The dockboard is adapted to bridge the gap between the loading dock and the bed of a truck or carrier which is located in front of the dock.

Dockboard 1 includes a supporting structure of frame 4 and the rear end of a ramp of deck plate 5 is pivoted to the supporting structure, so that the ramp is movable from a generally horizontal cross traffic position, where the ramp is generally flush with the upper surface of the dock 3, to an upwardly inclined position, as shown in FIG. 1. In addition, the ramp is capable of moving downwardly to a below dock level position.

Hinged to the forward edge of the ramp 5 is a lip 6 which is movable between a downwardly hanging pendant position and an outwardly extended position, as shown in FIG. 1, where the lip forms an extension to the ramp. Lip 6 is hinged to ramp 5 by a series of lugs 7 which are connected to the underside of the lip and are mounted for rotation on a hinge pin 8 which is connected to the forward end of the ramp. The construction of the frame, ramp and lip is conventional and can be of a type such as shown in U.S. Pat. No. 4,068,338.

A main lifting cylinder 9 interconnects the frame 4 and ramp 5 and serves to pivot the ramp from the horizontal cross traffic position to the upwardly inclined position, while a second lip lifting cylinder 10 interconnects the ramp and the lip and acts to move the lip to the extended position.

The main cylinder unit 9 can be constructed similar to that shown in U.S. Pat. No. 4,365,374. The cylinder unit 9 includes a cylinder 11 which is pivoted to lugs 12 on the frame 4. Cylinder 11 is composed of a generally cylindrical outer shell 13, the ends of which are enclosed by a lower head 14 and an upper head 15. A piston 16 is mounted for sliding movement in shell 13 and carries a piston rod 17 that extends through head 15.

Hydraulic fluid is supplied to the upper end of the cylinder through fitting 18 and is supplied to the lower end of the cylinder through fitting 19. Lines 20 and 21 are connected to the fittings 18 and 19 respectively, while the opposite ends of lines 20 and 21 are connected to a velocity fuse 22. Velocity fuse 22 is of conventional construction and serves to prevent rapid descent of the ramp 5 in the event a truck pulls away from the loading dock with an added load, such as a fork lift truck, on the ramp.

Line 23 connects velocity fuse 22 with a reservoir 24 for hydraulic fluid and an orifice 25, of conventional construction, is positioned in line 23 and permits free flow of hydraulic fluid from reservoir 24 through line 23 to main cylinder 9, but provides a restriction to flow in the opposite direction.

A conventional motor pump unit 26 is mounted adjacent reservoir 24, and when operated, serves to deliver hydraulic fluid from reservoir 24 through line 23 to fittings 18 and 19 of the main cylinder 9.

As illustrated in FIG. 1, the upper end of piston rod 17 is pivotally connected to lugs 27 on the underside of ramp 5.

Figure 2:
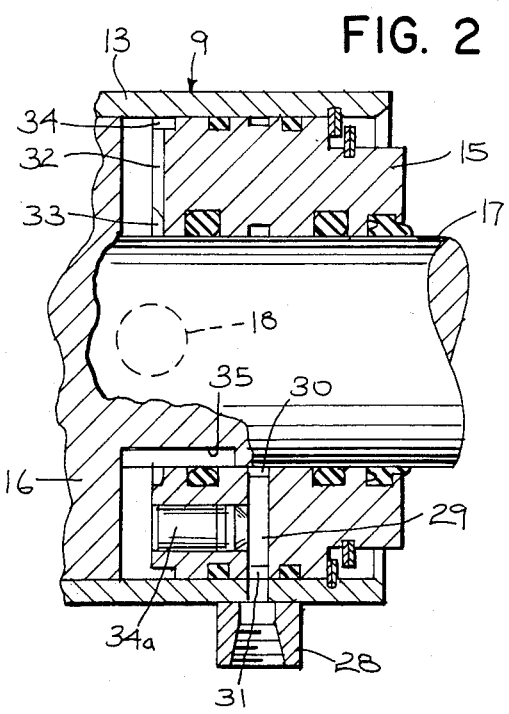
FIG. 2 is a fragmentary enlarged longitudinal section of the main lifting cylinder showing the piston as it approaches the cylinder head.

The construction of upper head 15 is best illustrated in FIG. 2. A fitting 28 is connected to cylinder 11 and communicates with a radial passage 29 in head 15. The ends of radial passage 29 communicate with an inner annular passage 30 and an outer annular passage 31, respectively. The inner face of head 15 is provided with a radial groove 32 which communicates with an inner annular recess 33 and an outer annular recess 34 that communicates with fitting 18.

An opening interconnects radial passage 29 and the interior of cylinder 11, and a conventional check valve 34a is disposed in the opening. Check valve 34a prevents flow of fluid from cylinder 11 to passage 29, but will open under a predetermined pressure differential to permit flow in the opposite direction.

When it is desired to raise ramp 5 to its upwardly inclined position, the operator pushes an "UP" button on a control panel, thereby operating the motor pump unit 26 to supply hydraulic fluid from the reservoir 24 through line 23 to the fittings 18 and 19 of main lift cylinder 9. The pressure on both sides of the piston 16 will be balanced, but due to the fact that the pressure acts against a larger surface area on the lower face of the piston than on the upper face, the differential in force will move the piston 16 upwardly, to extend piston rod 17 and pivot the ramp 5 to the upwardly inclined position.

As the piston moves upwardly, fluid will be supplied from reservoir 24 through line 23 and velocity fuse 22 to the fitting 19 at the lower end of the cylinder and fluid will also be displaced from the upper end of the cylinder through line 20 and velocity fuse 22 to the fitting 19. As the piston approaches the upper head, slot 35 formed in the piston rod adjacent the piston will move into alignment with the upper head 15 and will establish communication between the annular passage 30 and the radial passage 29 and fitting 28, so that hydraulic fluid can then flow from the fitting 18 into outer recess 34, through radial groove 32 to inner recess 33, and then through slot 35 and radial passage 29 to fitting 28.

Figure 5:
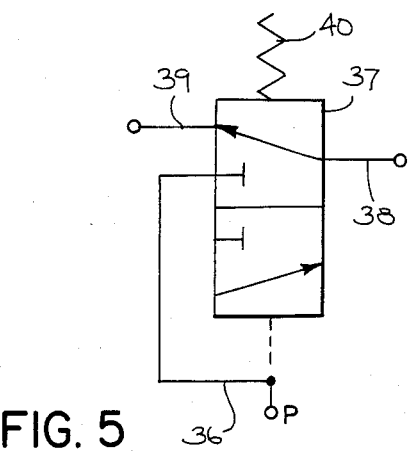
FIG. 5 is a schematic representation showing the position of the control valve when the ramp is in the position shown in FIG. 4.
Figure 6:
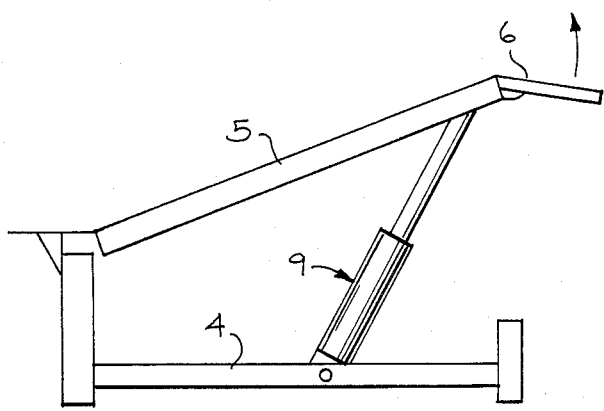
FIG. 6 is a schematic representation showing the ramp in an upwardly inclined position with the lip extended.
Figure 7:
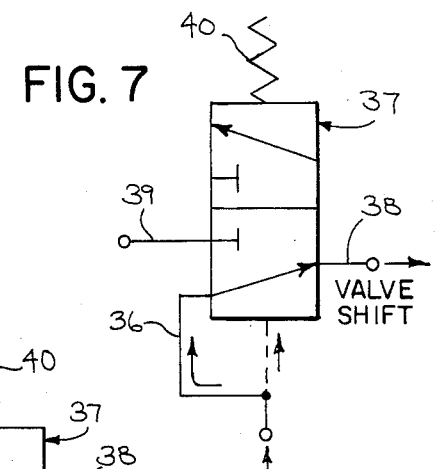
FIG. 7 is a schematic representation showing the position of the control valve when the ramp and lip are as shown in FIG. 6.

In accordance with the invention, a hydraulic supply line 36 is connected between fitting 28 and a port in control valve 37. In addition, a second line 38 connects control valve 37 with the lower end of lip cylinder 10 and a return line 39 connects control valve 37 with the reservoir 24. The construction of control valve 36 is illustrated schematically in FIGS. 5, 7 and 9.

Figure 4:
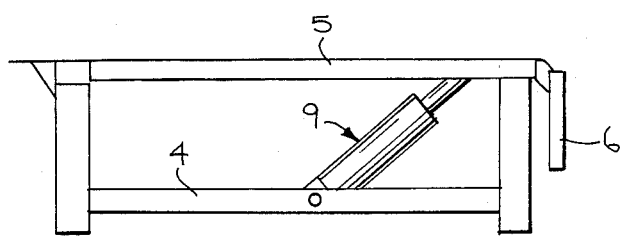
FIG. 4 is a schematic representation showing the ramp in the horizontal cross traffic position and the lip in the downwardly hanging position.

Ramp 5 is normally stored in the horizontal cross traffic position, such as illustrated schematically in FIG. 4. With the ramp in the cross traffic position, and the lip in the downwardly hanging pendant position, control valve 37 will be biased to the position shown in FIG. 5, in which line 38 is connected to the return line 39. The biasing force of a spring indicated schematically by 40.

After a truck 41 has pulled into position in front of the dock 3 for loading, the operator will push the "UP" button on the control panel which operates the motor pump unit 26 to supply pressurized hydraulic fluid from reservoir 24 through lines 20 and 21 to both ends of cylinder 11. Due to the difference in force supplied to opposite faces of piston 16, as previously described, the piston will be moved upwardly in the cylinder to extend piston rod 17, causing ramp 5 to move to the upwardly inclined position. As piston 16 moves upwardly in cylinder 11, fluid in the upper portion of the cylinder 11, above piston 17, will be displaced through lines 20 and 21 to the lower portion of the cylinder, beneath the piston.

As the piston approaches the upper head 15, the slot 35 in rod 17 will establish communication between the interior of cylinder 11 and the radial passage 29, thereby permitting hydraulic fluid to flow from the cylinder through the line 36 to control valve 37. The fluid in line 36 will pressurize the valve which the pressurized fluid will be supplied through control valve 37 and line 38 to the lip cylinder 10 to thereby move the lip to the extended position. As the entire hydraulic system is pressurized, the added volume of fluid to be supplied to the lip cylinder 10 will be delivered from the reservoir 24 via the main cylinder 9.

With the ramp fully elevated, the operator will then disengage the "UP" button on the control panel, discontinuing the flow of pressurized fluid to the main cylinder 9. Due to the combined weight of the ramp and the lip, the ramp will descend by gravity and the hydraulic fluid located in main cylinder 9, beneath piston 16, will flow through line 21, velocity fuse 22 and line 20 to the upper end of the cylinder 11 as the piston 16 descends within the cylinder. Because the effective area of the cylinder 11, beneath the piston 16, is greater than that above the piston, a portion of the displaced fluid from the lower end of the cylinder will be returned to the reservoir 24 through line 23. In passing through orifice 25 in line 23, a back pressure is generated, sufficient to prevent the lip from pivoting downwardly by gravity. Thus, as the ramp descends, the lip will be retained in the extended position.

Figure 9:
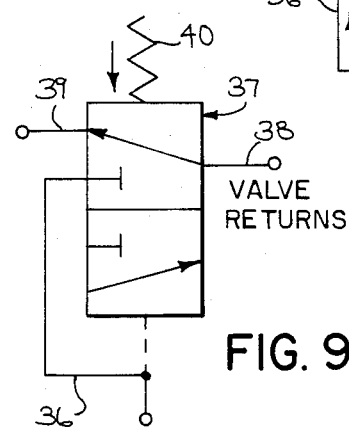
FIG. 9 is a schematic representation showing the position of the control valve when the ramp and lip are in the position shown in FIG. 9.
Figure 8:
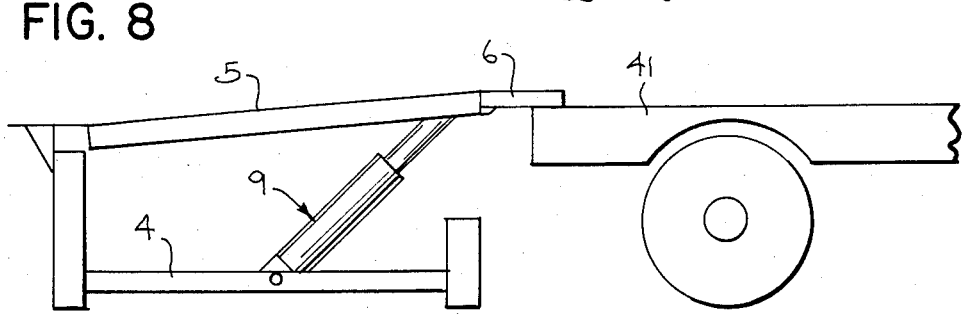
FIG. 8 is a schematic representation showing the dockboard with the extended lip being supported on the bed of a carrier.

When the lip is lowered into engagement with the bed of a truck or carrier 41, as shown in FIG. 8, both the ramp 5 and lip are then supported by the bed of the truck and the pressure in the main cylinder 9 will drop to near ambient pressure. The reduction in pressure in main cylinder 9 will cause the check valve 34a to open to correspondingly reduce the pressure in line 36. This reduction in pressure in line 36 will enable the biasing force of spring 40 to return the control valve 37 to its original condition, where line 38 is connected to return line 39, as shown in FIG. 9.

After the loading operation has been completed and the truck pulls away from the dock, the combined weight of the ramp and lip will again cause the ramp to descend and the lip will pivot downwardly by gravity to its pendant position. Downward movement of the lip will cause the piston rod of the lip cylinder to be retracted and forcing fluid from the lower end of the lip cylinder through line 38 and return line 39 to the reservoir 24. Thus, valve 37 permits the lip to return to its pendant position when the truck pulls away from the dock and without the necessity of the ramp having to move to a below dock level position. Through this construction, certain loading operations, such as end loading and night storage are simplified. For example, in a situation where a loading operation had not been completed, it may be desired to store the ramp in its cross traffic horizontal position without the truck pulling away from the dock. With the present hydraulic system, utilizing control valve 37, the operator can actuate the ramp "UP" button causing the ramp to move upwardly, and as the pressure has been released in control valve 37, due to engagement of the lip with the truck bed 41, raising of the ramp will cause the lip to drag off the truck bed and fall to the pendant position. Thus, the dockboard can be stored with the ramp in the horizontal position and the lip in the pendant position without the necessity of moving the truck away from the loading dock.

While the description and drawings have shown the hydraulic fluid being supplied to lip cylinder 10 via the main cylinder 9, it is contemplated that in certain installations, the hydraulic fluid can be supplied to the lip cylinder separately, rather than passing through the main lift cylinder 9.

Various modes of carrying out the invention are contemplated as being within the scope of the following claims particularly pointing out and distinctly claiming the subject matter which is regarded as the invention.

I claim:

1. A hydraulically operated dockboard to be mounted on a loading dock, comprising a supporting structure connected to the dock, a ramp hinged at its rear edge to the supporting structure and movable between a generally horizontal position and an upwardly inclined position, a lip hinged to the forward edge of the ramp and movable between a downwardly hanging pendant position and an outwardly extended position, a first hydraulic cylinder unit interconnecting the ramp structure and the supporting structure, means for supplying hydraulic fluid to said first cylinder unit, a predetermined working pressure in said first cylinder unit raising said ramp from the horizontal position to the upwardly inclined position, a second cylinder unit interconnecting the ramp and the lip, second supply means for supplying hydraulic fluid to the second cylinder unit to move the lip from the pendant position to the extended position, said second supply means including a supply line connected to said first cylinder unit, a lip line connected to said second cylinder unit, a return line connected to a storage reservoir for said hydraulic fluid, and control valve means interconnecting said supply line, said lip line and said return line, said valve means having a first position wherein said lip line is connected to said return line and having a second position wherein said lip line is connected to said supply line, biasing means for urging said valve means to said first position, said first cylinder unit being constructed and arranged so that elevation of said ramp to a given position will act to supply fluid at said working pressure from said first cylinder unit to said supply line, means responsive to said working pressure in the supply line for moving said valve means from the first position to the second position and supplying fluid at said working pressure from said first cylinder unit through said supply line, through said valve means and through said lip line to said second cylinder unit to move the lip from the pendant to the extended position, downward movement of said ramp from said upwardly inclined position providing a back pressure in said supply line sufficient to maintain said valve means in said second position, said valve means being arranged and constructed so that engagement of the extended lip with the bed of a carrier located in front of said dock will release the pressure in said supply line and enable said biasing means to return said control valve means to said first position, movement of said carrier away from said dock causing said lip to fall by gravity from the extended toward the pendant position, downward pivoting movement of said lip acting to displace fluid from said second cylinder unit through said control valve and said return line to said reservoir.

* * * * *